United States Patent [19]

Staltmeir et al.

[11] 4,226,168
[45] Oct. 7, 1980

[54] SPRING-LOADED BRAKE CYLINDER

[75] Inventors: Josef Staltmeir; Bernd Wosegien, both of Munich; Julius Nadas, Eching, all of Fed. Rep. of Germany

[73] Assignee: Knorr-Bremse GmbH, Munich, Fed. Rep. of Germany

[21] Appl. No.: 955,368

[22] Filed: Oct. 27, 1978

[30] Foreign Application Priority Data

Oct. 28, 1977 [DE] Fed. Rep. of Germany ....... 2748540

[51] Int. Cl.³ .......................... F16J 1/10; F01B 31/00
[52] U.S. Cl. .................................. 92/130 A; 92/116; 188/170
[58] Field of Search ................. 92/116, 130 R, 130 A; 188/170

[56] References Cited
U.S. PATENT DOCUMENTS 3,994,206  11/1976  Dahlkvist et al. ................ 92/130 A
4,063,491  12/1977  Roger et al. ....................... 92/116

Primary Examiner—Paul E. Maslousky
Attorney, Agent, or Firm—Edmund M. Jaskiewicz

[57] ABSTRACT

A spring-loaded brake cylinder particularly for the air brake system of a railway vehicle has a piston slidable within a housing and a threaded shaft and nut assembly between the piston and a piston rod. The nut is carried upon a non-self-locking thread on the threaded shaft and either the shaft or nut is rotatable and the other is non-rotatable. A loading spring has one end supported by a portion of the housing and secured against axial displacement and has a second end acting against the piston. A selectively operable rotary coupling is disposed in the path of the torque resulting from the force exerted by the spring acting upon the shaft and nut assembly so that the shaft and nut are free to rotate with respect to each other when the rotary coupling is actuated.

14 Claims, 7 Drawing Figures

SPRING-LOADED BRAKE CYLINDER

The present invention relates to a spring-loaded brake cylinder such as for railway vehicles, more particularly, to the moderating of the force with which a tensioning piston together with a loading spring strikes an end stop in the brake cylinder when the cylinder is subjected to an emergency release.

One form of a spring-loaded brake cylinder particularly adapted for use with the air brake system of a railway vehicle has a loading spring one end of which is supported against a portion of the cylinder housing and secured against axial displacement and the other end acts upon a threaded shaft and nut assembly positioned between a tensioning piston of the brake cylinder and a piston rod. The shaft and nut assembly includes a non-self-locking screw coupling one part of which is rotatably mounted and the other part held against rotation. A selectively operable rotary coupling is positioned between the rotatable part of the shaft and nut assembly and the other part thereof which is non-rotatable.

One such spring-loaded brake cylinder is disclosed in DT-OS No. 26 08 502 wherein in the housing there is provided a selectively operable locking mechanism which secures one of the coupling members against rotation when the lock is not actuated but permits rotation of the coupling part when the lock is actuated. When this lock is operated under an operated brake condition, the loading spring becomes untensioned as result of which the rotatably mounted component of the threaded shaft and nut assembly is rotated together with the coupling member. The components which are thus set in rotation have a relatively low rotary moment, and as a result these components can be rapidly accelerated to a high rotary speed. Accordingly, the untensioning of the loading spring increases at a corresponding rate such that the spring and the tensioning piston strike an end stop in the housing at a high speed. This stop may be with such an impact as to cause damage to various components of the brake cylinder. In addition, upon striking of the end stop the components, which are rotating at a high speed in the brake cylinder, are suddenly stopped by the non-self-locking screw coupling which produces a very high localized stress of the threads.

A further disadvantage of this spring-loaded brake cylinder is that the rotary coupling which is between the rotatable component of the screw coupling and the coupling member and which permits axial displacement, is subjected to severe stress by the torque effected by the loading spring in the non-self-locking screw coupling. The friction produced in the screw coupling thus causes a strong dissipation of the braking force that could be exerted by the spring-loaded brake cylinder.

It is therefore the principal object of the present invention to provide a novel and improved spring-loaded brake cylinder of the type described above.

It is another object of the present invention to provide such a spring-loaded brake cylinder which significantly reduces the speed at which a tensioning piston together with the loading spring strikes an end stop in the housing of the cylinder when an emergency release operation is introduced to the brake cylinder.

It is an additional object of the present invention to provide such a spring-loaded brake cylinder that upon operation of a rotary coupling to introduce an emergeny release procedure no significant impact stresses are generated by any striking of the piston and loading spring upon a portion of the cylinder housing.

It is a further object of the present invention to provide such a spring-loaded brake cylinder that, when subjected to an emergency release procedure, the magnitude of the braking force that can be delivered by the brake cylinder is not reduced or dissipated through unnecessary friction.

According to one aspect of the present invention a spring-loaded brake cylinder may comprise a piston slidable within a housing and a threaded shaft and nut between the piston and a piston rod. The threaded shaft has a non-self-locking thread and the nut is carried on the thread. Either the shaft or nut is rotatable and the other is non-rotatable. A loading spring within the housing has one end supported by a portion of the housing and secured against axial displacement and a second end acting against the piston. Rotary coupling means are provided in the path of torque resulting from the force exerted by the spring acting upon the shaft and nut so that the shaft and nut are free to rotate with respect to each other when the rotary coupling means is selectively actuated. Thus, the torque effected by the force of the loading spring upon the threaded shaft and nut assembly can be supported by its rotatably mounted component through the loading spring and a rotary coupling connected in series with respect to the rotatably mounted part and spring with respect to the flow of torque.

Upon operation of the rotary coupling the relatively heavy loading spring, which has a large diameter, is thus taken along by the rotating component of the non-self-locking screw coupling such that only a relatively slow acceleration of the rotation of these components occurs. The untensioning of the loading spring is thus at a correspondingly slower rate and the tensioning piston will strike the end stop at a relatively low speed. Every component of the spring-loaded brake cylinder is thus protected against stresses produced by hard impact. The loading spring also contributes to the decrease in stresses from hard impacts since the elasticity and relative resiliency of the spring in its untensioned state enables the spring to gradually and controllably stop the rotation of the rotating components.

The selectively operable rotary coupling is preferably positioned between the axially undisplaceable end of the loading spring and the portion of the housing supporting this end of the spring. In this location it is not necessary to provide the rotary coupling with the possibility of axial displacement with respect to the housing portion. This arrangement of the rotary coupling is also advantageous since a plate can be disposed between the loading spring and this housing portion which plate is rotatably supported against the housing portion by a thrust bearing. The rotary coupling can be mounted so as to be effective between this spring plate and the housing portion.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
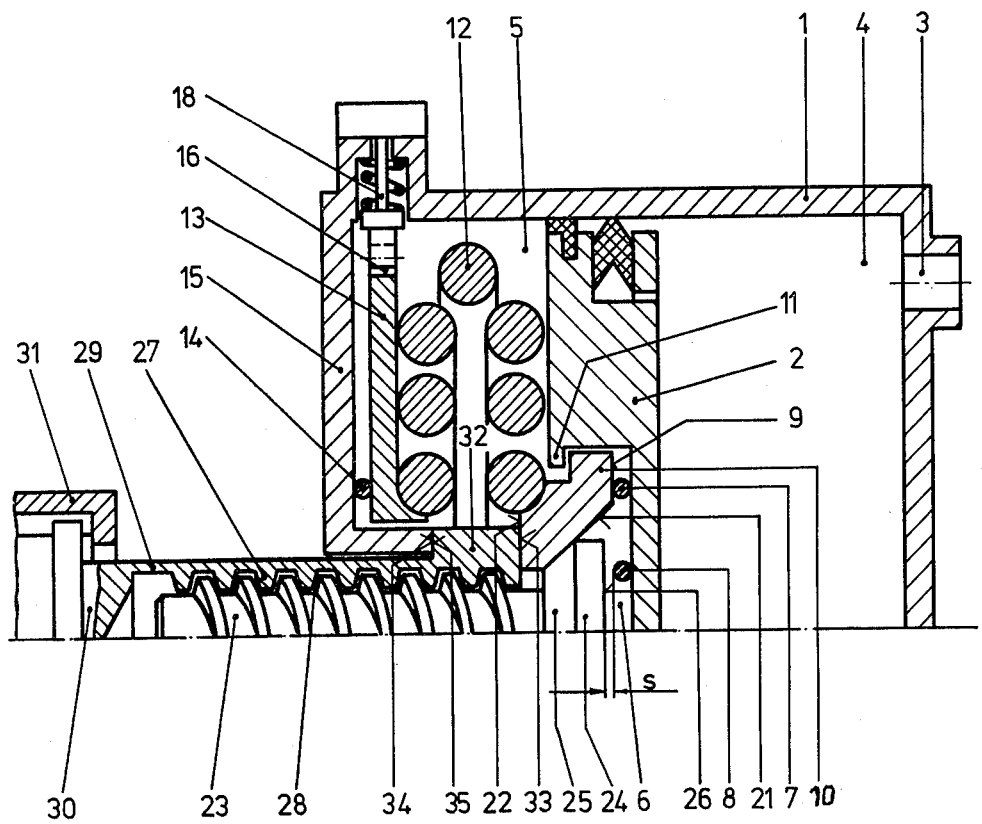
FIG. 1 is an axial sectional view of one half of a spring-loaded brake cylinder according to the present invention with the cylinder being shown in its released position.

The spring-loaded brake cylinder according to the present invention is shown in its released position in FIG. 1 and has a housing 1 in which a tensioning piston 2 is slidably and sealingly guided for axial displacement in the housing. The housing 1 has a pipe connection 3 which can be connected to a source of a pressure medium, such as compressed air, so as to fill a chamber 4 within housing 1. One side of chamber 4 is defined by a face of the piston 2.

On the other face of piston 2 away from the chamber 4 there is defined within the housing 1 a chamber 5. In this other face of piston 2 there is a central disk-type indentation or recess 6 in which are positioned two axial thrust bearings 7 and 8 of different diameters, as shown. Thrust bearing 7, having the larger diameter, provides support for an annular radial surface 9 of a coupling ring 10 which is rotatably mounted in the recess 6 and retained in the recess by means of an annular flange 11 on the piston 2.

Within the chamber 5 there is a loading spring 12 which is in the shape of a double cone, as may be seen in FIG. 1. One end of spring 12 is supported on a correspondingly shaped annular surface near the outer circumference of the coupling ring 10 and the other end of spring 12 is supported on a correspondingly shaped surface on a circular spring plate 13.

Figure 7:
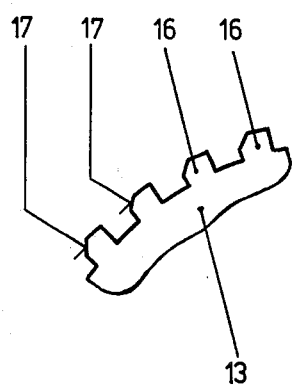
FIG. 7 is a plan view of a portion of the plate comprising a component of the rotary clutch and showing the ratchet teeth thereon.

The spring plate 13 is in the form of an annular or ring shaped member and is rotatably supported on an inwardly directed portion of end wall 15 of the housing 1. The plate 13 is supported against the end wall 15 by a thrust bearing 14. The outer periphery of spring plate 13 is provided with spaced indentations or recesses, as may be seen in FIG. 7, to form a plurality of radially extending locking teeth 16 each of which is provided on a radially outer portion with inclined or sloping surface 17. The locking teeth 16 engage a pawl 18 which is moveably mounted in housing 1 so as to be capable of radial displacement with respect to the plate 13. A spring 19 loads the pawl 18 in the direction to engage locking teeth 16. The pawl 18 may be provided with a handle 20 disposed outside of the housing 1 so as to enable the pawl to be operated as may be desired.

The teeth 16 of plate 13 together with the pawl 18 thus define a ratchet device which is effective only in a transition phase between disengaged and engaged coupling positions and free-wheeling in the direction of rotation for unscrewing the shaft and nut assembly to be presently described. If this rotary coupling remains engaged while the spring plate is rotating, the ratchet device will slip and through its ratcheting effect will gently and gradually slow down the rotation of the spring plate 13 and the loading spring 12. Other suitable forms of a ratchet device may be employed.

The coupling ring 10 is provided with a conical surface 21 on its side directed toward the piston 2 and radially inwardly of the radial surface 9. The ring 10 is further provided with a radial annular surface 22 which is positioned opposite surface 21 radially inwardly of the contact with loading spring 12. Passing through the central opening of coupling ring 10 with play or clearance is a threaded shaft 23 on the end of which is a disk-type enlargement 24 positioned within recess 6 of the piston 2. The enlargement 24 has on one side thereof a conical surface 25 that faces toward conical surface 21 and these two conical surfaces form an abutment coupling 21, 25. When conical surfaces 21 and 25 are in contact with each other such that abutment coupling 21,25 is engaged, an end surface 26 on the enlargement 24 which is directed toward piston 2 is spaced from thrust bearing 8 a small axial distance s. The abutment coupling 21, 25 is thus loaded in a direction of engagement by the loading spring 12 acting against the force exertable by the tensioning piston 2. When the loading spring 12 is tensioned by the piston 2 subsequent to an operation of the rotary coupling, the abutment coupling 21,25 will be disengaged so that the rotatable element of the shaft and nut assembly which was screwed out during the emergency release can be rapidly screwed in again.

The threaded shaft 23 is coupled to a tubular element nut 27 by means of a non-self locking-thread 28. The nut 27 which includes a tubular element 29, is positioned with play within the opening formed in end wall 15 of the housing 1 so that the tubular element 29 is capable of axial displacement therein. One end 30 of the tubular element 29 is closed and extends outwardly of the housing 1. The end 30 is non-rotatably connected to an element 31 of the brake linkage which is to be operated by the spring-loaded brake cylinder. The element 31 is similarly non-rotatably mounted in a manner as known in the art. The closed end 30 of the tubular element 29 thus protects the interior of the brake cylinder against dirt and other foreign matter. In the embodiment as described the tubular element 29 is non-rotatable and the threaded shaft 23 is rotatable.

The tubular nut element 29 has an end which terminates within the housing 1 and this end is provided with an enlarged flange 32. This end flange 32 has radial surfaces 33 and 34 which are respectively directed toward annular surface 22 and an annular stop surface 35 formed on the inwardly turned portion of end wall 15. The flange enlargement 32 of the non-rotatable tubular nut 29 of the shaft and nut assembly is thus disposed in the vicinity of the piston 2 and in the released position its face surfaces 33 and 34 engage the respective stop surfaces of the end wall and coupling ring. When the spring-loaded brake cylinder is in the released position, the non-rotatable tubular nut 29 which transmits the force of the spring-loaded brake cylinder thus obtains an effective holding position as result of the clamping between the coupling ring and the housing. This holding is particularly effective and advantageous when a service brake cylinder is flanged unto the spring-loaded brake cylinder since this holding arrangement permits effective guiding of the piston of the service brake cylinder.

The non-rotatable tubular element 29 of the threaded shaft and nut assembly is thus axially positioned by engagement of its radial surface 34 with stop surface 35 on the housing 1 to fix the release position of the spring-loaded brake cylinder.

According to the present invention the coupling ring 10 can also be secured in the released position by providing a further stop on a portion of the housing 1.

The threaded shaft 23 and the tubular nut element 29 thus together form a threaded shaft and nut assembly 23,29 wherein the shaft 23 is the rotatable component and the tubular nut 29 is secured against rotation so as to be non-rotatable.

It is preferable according to the present invention as described above that the loading spring 12 contacts the coupling ring 10 disposed in the vicinity of a side of the piston 2 in such a manner that the abutment coupling 21,25 is located between the coupling ring and the rotatable tubular nut 29 of the threaded shaft and nut device. The coupling ring is thus supported in the direction of effect of the loading spring against the piston 2 such that the coupling ring is capable of rotation by being supported against thrust bearing 7. A similar thrust bearing is provided between the end of the rotatable threaded shaft 23 and the piston 2 but there is an axial play between shaft 23 and thrust bearing 8 when the abutment coupling is engaged.

When the spring-loaded brake cylinder of the present invention is in the released position, i.e. the brakes are not applied, the components are in the positions as illustrated in FIG. 1. The admission chamber 4 is subjected to the action of a pressure medium introduced through connection 3 to urge the piston 2 into the position shown to hold the loading spring 12 compressed through the action of thrust bearing 7 and coupling ring 10. The selectively operable rotary coupling, consisting of pawl 18 and locking teeth 16 of spring plate 13, is engaged under the force of spring 19 as result of which plate 13 is retained against rotation. The enlarged end 32 of the tubular nut 29 is clamped between coupling ring 10 and housing 1 as result of the contact of enlarged end surfaces 33 and 34 respectively engaging stop surfaces 22 and 35 under a force component exerted by piston 2 that exceeds the force of loading spring 12. As result of this clamping, the tubular nut element 29 is retained in a precise position so that this element 29 can be employed as a guide for the piston of a service brake cylinder, which is not illustrated. The enlargement 24 on the inner end of threaded shaft 23 is positioned between thrust bearing 8 and conical surface 21. The conical surface 25 of enlarged end 24 may rest without any force upon conical surface 21 of coupling ring 10.

Figure 2:
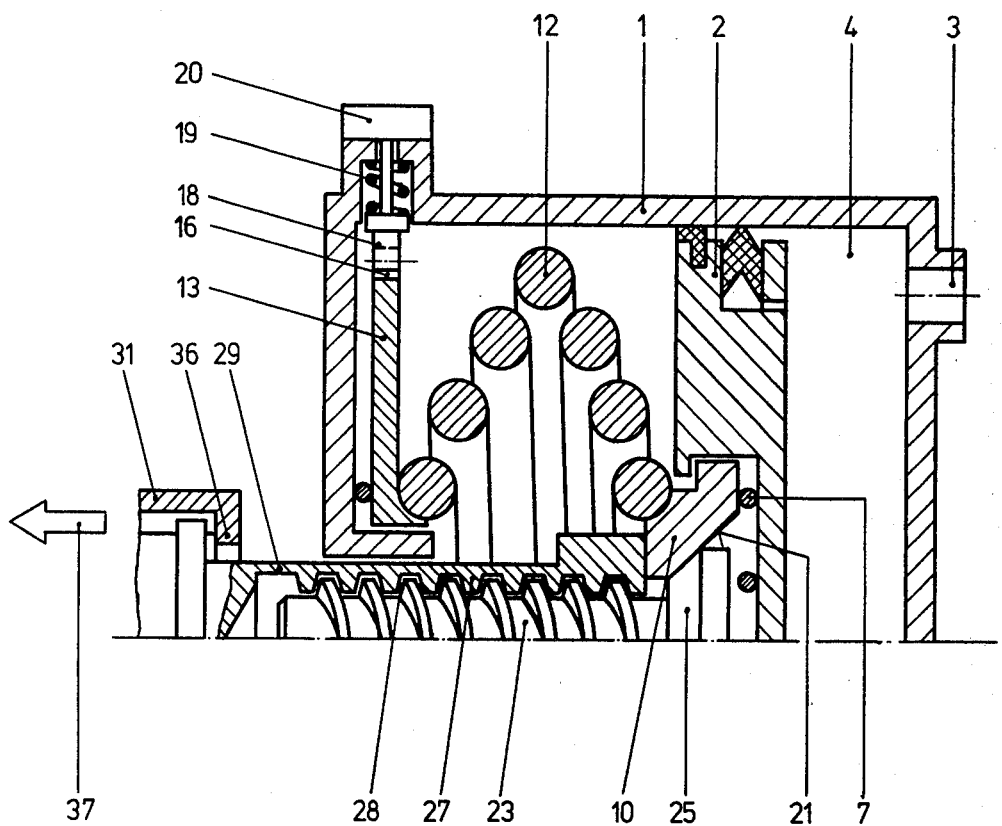
FIG. 2 is a view similar to that of FIG. 1 but showing the brake cylinder in a braking position.

In order to initiate a braking operation, the pressure in chamber 4 is reduced through connection 3 to a predetermined degree which might be to the atmospheric pressure level. The loading spring 12 acting through coupling ring 10 and thrust bearing 7 then forces piston 2 to the right into the position as shown in FIG. 2. During this displacement of piston 2 conical surface 21 of coupling ring 10 will engage conical surface 25 on shaft 23 so that the abutment coupling 21,25 is engaged. The threaded shaft 23 is thus securely coupled to coupling ring 10 and held against rotation. The threaded shaft 23 is thus moved to the right together with the displacement of piston 2. The coupling ring 10 is coupled to spring plate 13 by means of loading spring 12 and thus secured against rotation and spring plate 13 is held against rotation by engaged rotary coupling 16,18. The threaded shaft 23 which is thus coupled to housing 1 without being able to rotate also carries along tubular nut 29 by means of thread 28. Because of the connection of tubular element 29 to linkage element 31 the tubular member is retained against rotation. By means of an abutment coupling indicated at 36, the linkage element 31 is also moved to the right by tubular element 29 against the force acting on the linkage element 31 is indicated in the direction of the arrow 37 and the brake, which is not shown, is thus applied. The torque effected in the threaded shaft 23 by the loading of its threads 28 with the axial force of loading spring 12 is transmitted through engaged abutment coupling 21,25, loading spring 12, spring plate 13 and engaged rotary coupling 16,18 to housing 1. The rotary coupling 16,18 is thus positioned in the path of torque flow to housing 1.

For an ordinary or regular release of the brakes after the application thereof as shown in FIG. 2, admission chamber 4 is again subjected to a pressure medium introduced therein through connection 3 and as a result tensioning piston 2 is forced to the left into its position as shown in FIG. 1. The movement to the left of piston 2 thus tensions loading spring 12 through thrust bearing 7 and coupling ring 10. Abutment coupling 21,25 remains engaged during the release operation under the force exerted by linkage element 31 in the direction of arrow 37.

Figure 3:
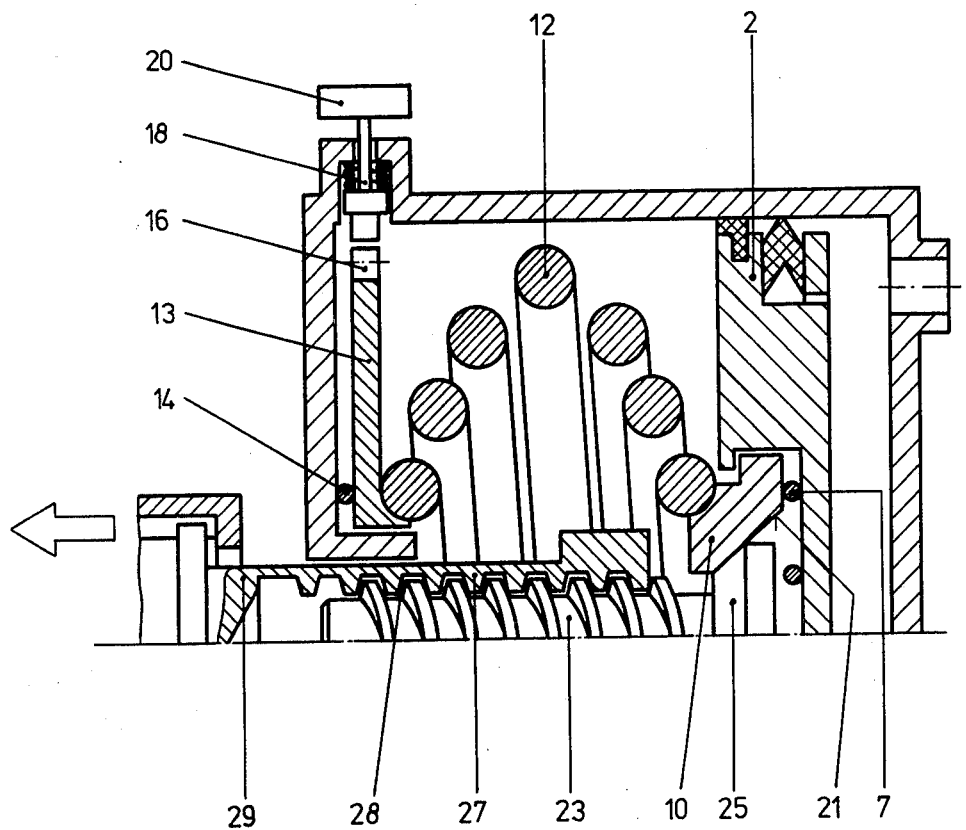
FIG. 3 is a view similar to that of FIG. 1 showing the brake cylinder in an intermediate position during the release procedure.

Should for any reason it be desired to initiate a brake release operation proceeding from the braked position of FIG. 2 without the introduction of a pressure medium into admission chamber 4, the handle 20 is manually pulled to lift pawl 18 against the force of spring 19 and to disengage pawl 18 from locking teeth 16. The spring plate 13 is thus no longer locked against rotation and threaded shaft 23 is screwed out of the tubular nut 29 to the right under the axial force of the loading spring 12 and by means of the non-self-locking thread 28 as may be seen in FIG. 3. The rotation of threaded shaft 23 brings about the unscrewing of the shaft 23 from the tubular nut 27. This rotation of the threaded shaft 23 is transmitted through abutment coupling 21,25 which is engaged under the force of loading spring 12 to coupling ring 10 and through loading spring 12 to spring plate 13 which begins to rotate on its thrust bearing 14. During this movement to the right of threaded shaft 23 the loading spring 12 is being untensioned.

The piston 2 is thus displaced to the right through thrust bearing 7. It is to be noted that while threaded shaft 23, coupling ring 10 and loading spring 12 with the exception of its left end which is contact with plate 13, are all rotating while being shifted to the right, the piston 2 is subjected to a displacement to the right without any rotation and plate 13 together with its contacting end of loading spring 12 rotates without any axial displacement. The coupling ring 10, loading spring 12 and spring plate 12 thus possess a considerable rotative moment so that their rotation is subjected to only a gradual acceleration. Consequently, the movement to the right of piston 2 is gradually accelerated rather than being in the force of a sudden and abrupt movement.

Figure 4:
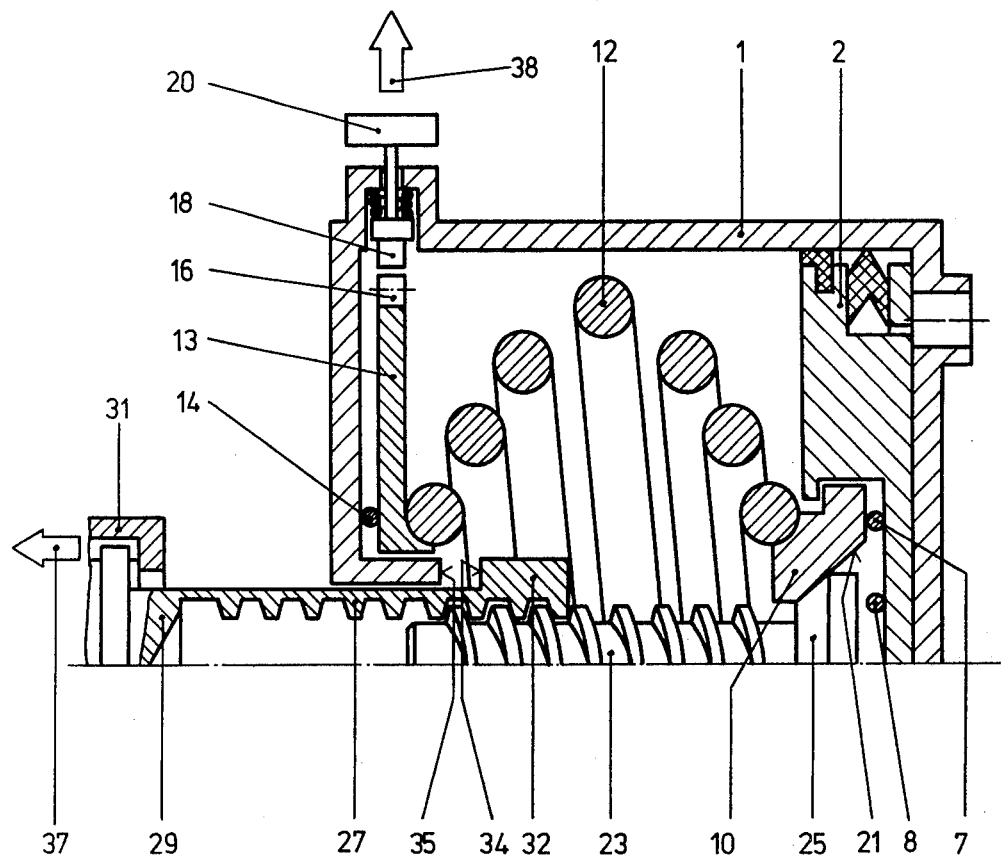
FIG. 4 is a view similar to that of FIG. 1 showing the brake cylinder at the end of the release procedure.

At the end of the brake release operation as shown in FIG. 4, the piston 2 contacts the right end wall of housing 1 within which is formed the connection 3. As result of the significantly reduced and moderate speed of movement of piston 2, there will not be any occurrence of a sudden hard impact. The remaining tension in rotating loading spring 12 is now supported against housing 1 on the one hand through spring plate 13 and thrust bearing 14 and on the other hand through coupling ring 10, thrust bearing 7 and tensioning piston 2. For the time being, rotary coupling 16,18 remains disengaged as result of the pulling action exerted on operating handle 20 in the direction of arrow 38. Even after tensioning piston 2 contacts the end wall of housing 1, loading spring 12, plate 13, coupling ring 10 and threaded shaft 23 which is still coupled to coupling ring 10 through the force of linkage element 31 acting in a direction of 37 will continue to rotate. While the threaded shaft 23 remains in its axial position the tubular nut 27 will be screwed to the left and the tubular element 29 together with linkage element 31 will move to the left as result of which the brake is released.

As soon as the brake is released in accordance with the operation as shown in FIG. 4, the force exerted by linkage element 31 disappears and the tubular element 29 reaches its position of complete release in which surface 34 of its enlarged end 32 contacts abutment surface 35 of housing 1. The threaded shaft 23 will be screwed to the right while still rotating so as to disengage abutment coupling 21,25. The threaded shaft 23 is thus disengaged from those components which constitute the major portion of the rotary moment which are the loading spring 12, coupling ring 10 and spring plate 13. Under the frictional effect exerted by thread 28 the threaded shaft 23 soon becomes stationary shortly before or upon contacting thrust bearing 8. Loading spring 12, coupling 10 and spring plate 13 will continue their rotation after threaded shaft becomes stationary while rotary coupling 16,18 remains disengaged through the operation of handle 20 in the direction of arrow 38. The positions of the components are now shown in FIG. 5.

It is to be noted that according to the present invention in proceeding from the brake position of FIG. 2 an emergency release operation achieved by operation of the rotary coupling 16,18 the main portion of the working energy of the untensioning loading spring 12 is transformed into rotational energy and particularly of the relatively heavy loading spring 12. This energy is not transformed into an impact or sharp contact type energy as generally occurred with spring-loaded brake cylinders as known up to the present time.

Figure 5:
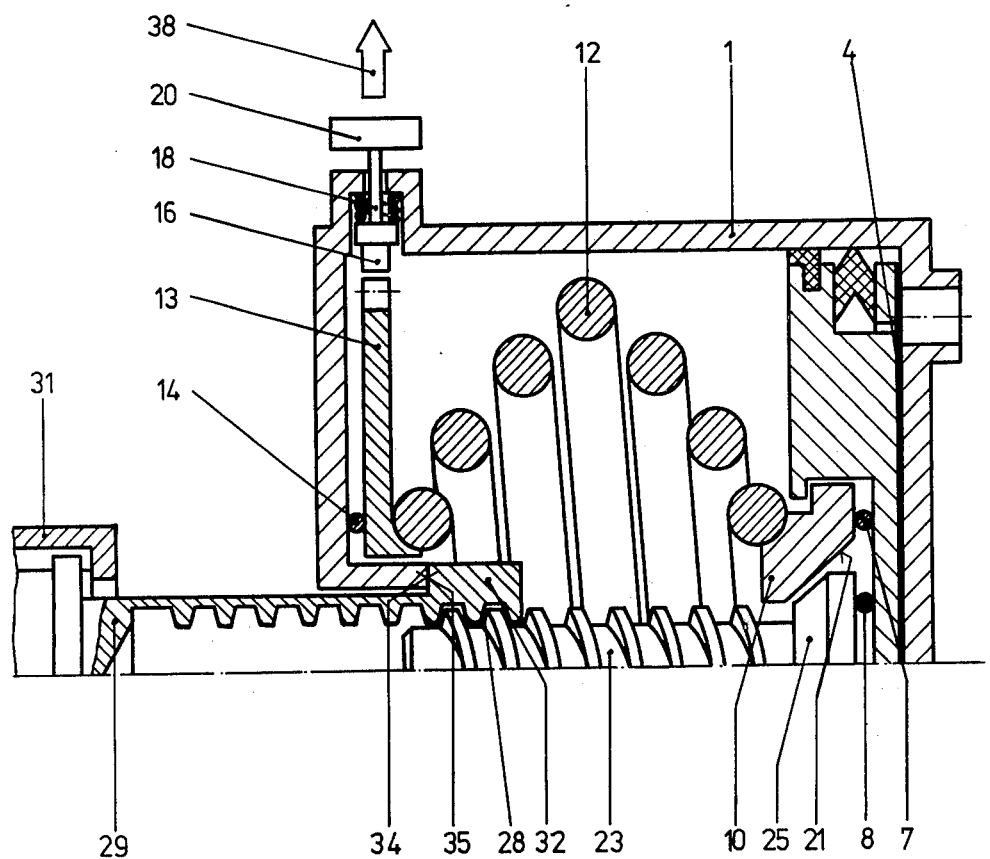
FIG. 5 is a view similar to that of FIG. 1 and showing the brake cylinder at the completion of the brake release operation.

Upon completion of the brake release operation as shown in FIG. 5, the handle 20 can now be released. Spring 19 thus forces pawl 18 against locking teeth 16 of the still rotating plate 13. The pawl 18 initially engages the oblique surfaces 17 of the locking teeth and is guided by these oblique surfaces over the locking teeth 16. The friction thus occurring exerts a braking motion on the plate 13 together with the loading spring 12 and coupling ring 10 which are still rotating until the rotation ceases. The pawl 18 can then be fully locked between locking teeth 16 so that through the engagement of rotary coupling 16,18 spring plate 13 can again be coupled to housing 1 so as to prevent its rotation. It is also possible to continue the disengagement of rotary coupling 16,18 at least approximately to the time when the components stop rotating as result of the friction exerted by thrust bearings 7 and 14. This completes the emergency release operation according to the present invention.

Figure 6:
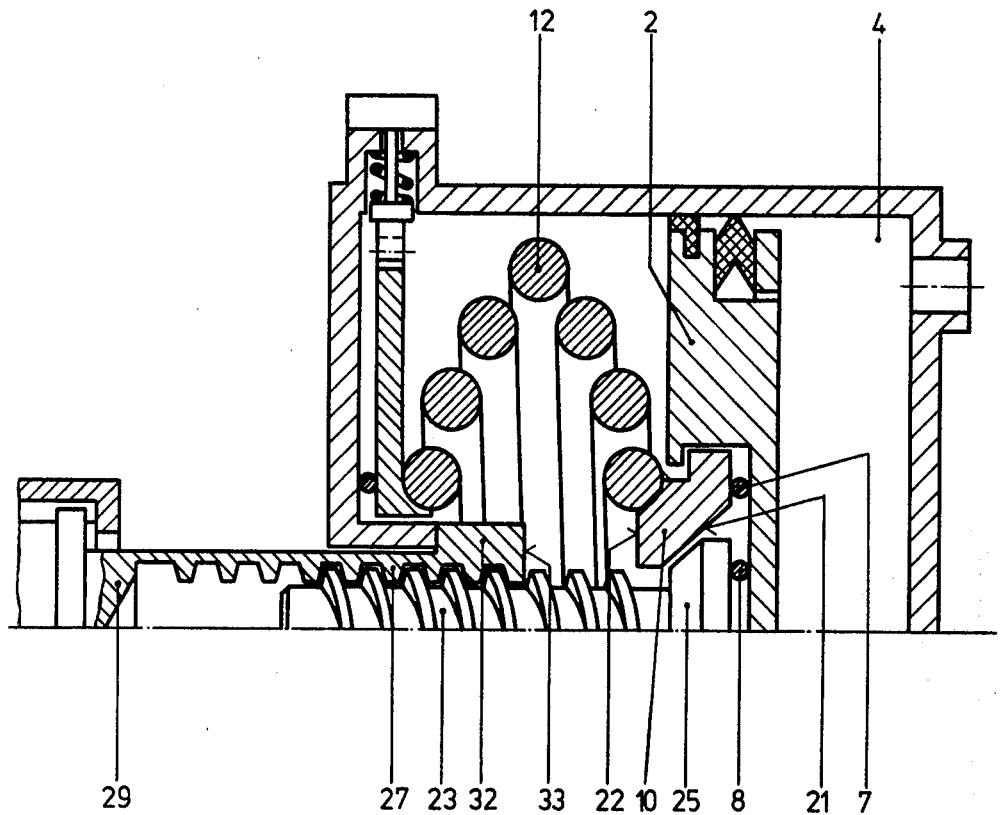
FIG. 6 is a view similar to that of FIG. 1 and showing the brake cylinder when being filled with a pressure medium after the brake release position of FIG. 5.

If the admission chamber 4 is again filled with fluid pressure medium so as to proceed from the emergency release position of FIG. 5 in which coupling 16,18 has been engaged, the tensioning piston 2 will be shifted to the left in the manner as illustrated in FIG. 6. The movement to the left of piston 2 tensions loading spring 12 through thrust bearing 7 and coupling ring 10 and the threaded shaft 23 is screwed to the left into the tubular nut 27 by piston 2 acting through thrust bearing 8. Abutment coupling 21, 25 is in the disengaged or released position. When abutment surface 22 of coupling ring 10 engages surface 33 of enlargement 32, the spring-loaded brake cylinder again automatically attains the released position ready for operation and all of the components assume their positions as shown in FIG. 1, with the exception of threaded shaft 23 which may be set in any position within its axial plays with respect to tensioning piston 2.

As an alternative or modification to the embodiment as disclosed above, the coupling ring 10 may be rigidly connected to the tensioning piston 2 while eliminating thrust bearing 7. The entire piston 2 then rotates together with loading spring 12 during an emergency release operation which increases the mass of the rotating components and at the same time increasing the friction opposing rotation of the rotating components. The untensioning of loading spring 12 is thus increasingly inhibited so that this untensioning slows down. The intensified friction produces a faster retardation of the rotating components after untensioning of loading spring 12 is completed.

In addition, the threaded shaft 23 and tubular nut 27 may be interchanged wherein the threaded shaft is held against rotation and coupled to linkage element 31 while the tubular nut 27 is rotatable and can be coupled to piston 2 and/or coupling ring 10.

The rotary coupling 16,18 can be located in any position of the path of torque flow from threaded shaft 23 to housing 1 during the braking position of the spring-loaded brake cylinder. A selectively operable rotary coupling can be provided in the area of or near abutment coupling 21,25. In this modification, the actuation mechanism for the rotary coupling must take into account and compensate for the displacement or stroke of piston 2 and/or threaded shaft 23.

It is preferable that the rotary coupling not be lockingly engaged immediately upon its release since the friction produced by the rotary coupling makes it possible to retard the rotating components. The rotary coupling can thus be constructed as a combined friction and gear coupling which during an operation of engagement the friction coupling is engaged first and subsequently the gear coupling is engaged. The rotary coupling can also be constructed as a friction coupling but care should be taken that in the braking position there should not be any frictionally caused slipping of the friction coupling. The use of the friction clutch permits obtaining an intensified braking effort to be exerted on the rotating spring plate when the friction clutch is engaged.

In the embodiment described herein the rotary coupling has been positioned between the axially non-displaceable end of the loading spring and the housing portion supporting the spring. However, it is also possible to locate the selectively operable rotary coupling between the tensioning piston and the loading spring while the other end of the spring is rotatable supported against a portion of the housing.

Thus it can be seen that the present invention has disclosed a spring-loaded brake cylinder wherein a rotary coupling is positioned in series with the threaded spindle, abutment coupling, loading spring and spring plate such that the selectively operable rotary coupling is in the path of the torque generated by these mentioned elements. As result, the impact of the tensioning piston against an end of the housing is significantly moderated and localized stresses in the threads of the threaded shaft and other components of the brake cylinder are eliminated.

It will be understood that this invention is susceptible to modification in order to adapt it to different usages and conditions, and accordingly, it is desired to comprehend such modifications within this invention as may fall within the scope of the appended claims.

What is claimed is:

1. A spring-loaded brake cylinder particularly for a railway vehicle and comprising a housing, a piston slideable within said housing, a threaded shaft and nut carried on said threaded shaft between said piston and a piston rod, said threaded shaft having a non-self-locking thread, one of said shaft and nut being rotatable and the other being non-rotatable, a loading spring within said housing having one end rotatably supportable by a portion of said housing and secured against axial displacement and a second end acting against said piston, means for coupling said spring second end and the rotatable one of said nut and shaft, said rotatable one capable of receiving a load imposed by said spring and of rotating in such a manner to permit torque to be transmitted to said housing, and rotary coupling means in the path of torque resulting from the force exerted by said spring upon said shaft and nut so that said spring and the rotatable one of said nut and shaft are free to rotate upon selective operation of said rotary coupling means.

2. A spring-loaded brake cylinder as claimed in claim 1 wherein said rotary coupling means is disposed between said one end of said loading spring and said portion of the housing.

3. A spring-loaded brake cylinder as claimed in claim 2 and further comprising a plate rotatably supported against said portion of the housing and said one end of said loading spring acting upon said plate, said rotary coupling means being disposed between said plate and said portion of the housing.

4. A spring loaded brake cylinder as claimed in claim 3 wherein said rotary coupling means comprises a rotatable ratchet having teeth with inclined surfaces thereon effective only in the transition phase between disengaging and engaging of the coupling and free wheeling in the direction of rotation for unscrewing said nut and shaft with respect to each other.

5. A spring-loaded brake cylinder as claimed in claim 3 wherein said rotatable coupling means comprises a selectively operable friction clutch.

6. A spring-loaded brake cylinder as claimed in claim 1 and said coupling means comprising an abutment coupling between said loading spring and the rotatable one of said threaded shaft and nut, said abutment coupling being urged into its engaged position by said loading spring against the force exerted by said piston.

7. A spring-loaded brake cylinder as claimed in claim 6 and further comprising a rotatable coupling ring disposed adjacent said piston and acted upon by the second end of said loading spring, said abutment coupling being disposed between said coupling ring and the rotatable one of said threaded shaft and nut, first thrust bearing means rotatably supporting said coupling ring against said piston, second thrust bearing means rotatably supporting the rotatable one of said shaft and nut against said piston, there being an axial play between said second thrust bearing means and said rotatable one of said shaft and nut when said abutment coupling is engaged.

8. A spring-loaded brake cylinder as claimed in claim 7 wherein said piston has a circular recess therein directed toward said loading spring, said coupling ring being rotatably mounted within said recess, said first and second bearing means being disposed within said recess.

9. A spring-loaded brake cylinder as claimed in claim 7 wherein said shaft is rotatable and on its end toward said piston has an enlarged diameter disk portion engageable with said second thrust bearing means, said enlarged disk portion also having a conical surface thereon engageable with a corresponding surface on said coupling ring.

10. A spring-loaded brake cylinder as claimed in claim 7 and further comprising stop means engageable by said coupling ring for axially positioning said coupling ring with respect to said housing when in a released position.

11. A spring-loaded brake cylinder as claimed in claim 2 wherein said nut is non-rotatable and has a stop surface thereon engageable with a second stop surface on said housing when said nut is in a released position.

12. A spring-loaded brake cylinder as claimed in claim 1 wherein said nut comprises a non-rotatable tubular element having internal threads therein and said threaded shaft being rotatable.

13. A spring-loaded brake cylinder as claimed in claim 12 wherein said non-rotatable tubular element has a closed end projecting outwardly of said housing and being axially displaceable.

14. A spring-loaded brake cylinder as claimed in claim 10 wherein said non-rotatable tubular element has a second end disposed adjacent said piston and an annular flange at said second end, said annular flange having on one side thereof a third stop surface engageable by said coupling ring and on another side thereof a fourth stop surface engageable with a portion of said housing in the released position of the brake cylinder.

* * * * *